United States Patent
Schneider et al.

[11] Patent Number: 6,052,991
[45] Date of Patent: Apr. 25, 2000

[54] ARRANGEMENT FOR INTERCONNECTING TWO PIPE SECTIONS IN A MOTOR VEHICLE EXHAUST SYSTEM

[75] Inventors: Horst Schneider, Gammelshausen; Arndt Peters, Weinstadt; Heiko Gensert, Waiblingen; Helmut Wierzba, Schwabach, all of Germany

[73] Assignees: DaimlerChrysler AG, Stuttgart; Leistritz AG & Co. Abgastechnik, Fürth, both of Germany

[21] Appl. No.: 09/131,820

[22] Filed: Aug. 10, 1998

[30] Foreign Application Priority Data

Aug. 11, 1997 [DE] Germany ............... 197 34 672

[51] Int. Cl.⁷ ................................ F01N 7/00
[52] U.S. Cl. ............... 60/322; 60/323; 285/49; 181/228
[58] Field of Search ............. 60/322, 323, 272; 285/49, 305, 910, 424; 181/228

[56] References Cited

U.S. PATENT DOCUMENTS

| | | | |
|---|---|---|---|
| 4,277,092 | 7/1981 | Viers | 285/263 |
| 4,462,603 | 7/1984 | Usher et al. | 277/230 |
| 4,641,861 | 2/1987 | Scoboria | 285/39 |
| 4,792,161 | 12/1988 | Usui . | |
| 5,683,119 | 11/1997 | Emmons et al. | 285/167 |
| 5,826,920 | 10/1998 | Bartholomew | 285/305 |
| 5,971,439 | 10/1999 | Cwik | 285/49 |

FOREIGN PATENT DOCUMENTS

| | | |
|---|---|---|
| 0 681 138 | 11/1995 | European Pat. Off. . |
| 76 23458 | 2/1978 | France . |
| 30 16 150 | 10/1981 | Germany . |
| 40 09 215 | 10/1990 | Germany . |
| 42 19 241 | 10/1992 | Germany . |
| 44 44 550 | 6/1996 | Germany . |
| 195 30 011 | 2/1997 | Germany . |
| 1 196 180 | 6/1970 | United Kingdom . |
| 1 512 320 | 6/1978 | United Kingdom . |
| 2 251 046 | 6/1992 | United Kingdom . |
| 2 320 542 | 6/1998 | United Kingdom . |
| WO 97/21952 | 6/1997 | WIPO . |

Primary Examiner—Thomas Denion
Assistant Examiner—Binh Tran
Attorney, Agent, or Firm—Klaus J. Bach

[57] ABSTRACT

In an arrangement for interconnecting two exhaust pipe sections of a motor vehicle exhaust system with a vibration dampening structure disposed between the two pipe sections, a first one of the pipe sections has a coupling member radially extending therefrom and the second pipe section has a coupling structure connected to the coupling member in a circumferentially elastic fashion so as to permit limited relative rotation between the two pipe sections.

10 Claims, 1 Drawing Sheet

ARRANGEMENT FOR INTERCONNECTING TWO PIPE SECTIONS IN A MOTOR VEHICLE EXHAUST SYSTEM

BACKGROUND OF THE INVENTION

The invention relates to an arrangement for interconnecting two exhaust pipe sections of a motor vehicle exhaust system with a dampening structure disposed between the two pipe sections.

Such pipe connections are used, among other applications to uncouple the exhaust system of a motor vehicle from the engine-generated vibrations.

FR-2 360 028 discloses an arrangement wherein a spiral spring is disposed between two pipe sections such that the two pipe sections are held resiliently in engagement with each other. In this way, engine vibrations are to be uncoupled which however occurs only in a very limited way.

DE 44 44 550 A1 discloses an arrangement for the interconnection of two pipe sections in the exhaust system of a motor vehicle wherein two connecting pieces of the pipe sections are held in engagement with each other by spring means generating a predetermined engagement force. This arrangement is intended to uncouple torsional vibrations.

The known pipe connections however have the disadvantage that the two pipe sections or pipes can be rotated relative to each other. As a result, these pipe connections can be utilized only if the two pipe sections are supported by special support structures which are connected to the engine, to the transmission, or to the vehicle body in such a way that the pipe sections are prevented from rotating relative to each other.

For the uncoupling and the dampening of engine generated torsional vibrations transmitted to the exhaust system, additional uncoupling elements are required. In this respect reference is made to DE 42 19 241 A1, which discloses an articulated coupling of pipe sections in the exhaust system of a motor vehicle wherein a dampening of torsional vibrations is achieved by elastic support pads arranged between the two pipe sections.

It is the object of the present invention to provide an arrangement for the interconnection of two pipe sections of a motor vehicle exhaust system wherein relative rotation between the two pipe sections is prevented and, at the same time, engine generated torsional vibrations are uncoupled from the exhaust system and, at least to some degree, also dampened.

SUMMARY OF THE INVENTION

In an arrangement for interconnecting two exhaust pipe sections of a motor vehicle exhaust system with a vibration dampening structure disposed between the two pipe sections, a first one of the pipe sections has a coupling member radially extending therefrom and the second pipe section has a coupling structure connected to the coupling member in a circumferentially elastic fashion so as to permit limited relative rotation between the two pipe sections.

With the elastic interconnection, or respectively, coupling between the two pipe sections, rotation of the two pipe sections relative to each other is mechanically prevented. At the same time, torsional vibrations induced in the exhaust system by the engine are directly uncoupled by the spring-elastic coupling without the need for an additional torsional uncoupling element.

The improvements in the properties of such couplings between two such pipe sections which are generally held in engagement by a spring engagement structure are achieved with relatively little expense. At the same time, the vibration behavior of the exhaust system, and consequently the comfort for the vehicle passengers is substantially improved. Furthermore, the whole exhaust system has lower overall costs since no separate torsion uncoupling elements are employed.

The invention will become more readily apparent from the following description of an embodiment thereof on the basis of the accompanying drawings.

DESCRIPTION OF THE PREFERRED EMBODIMENTS

Figure 1:
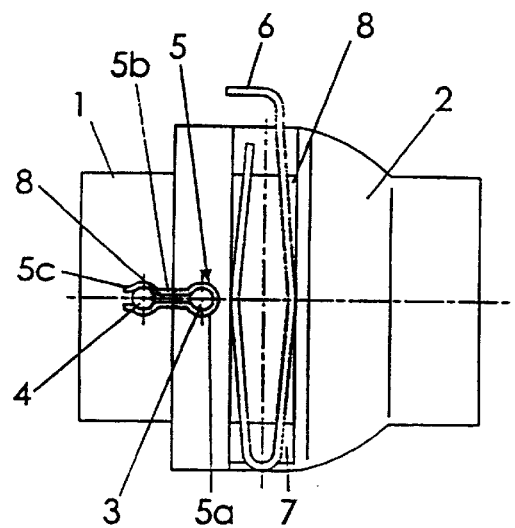
FIG. 1 is a side view of a pipe coupling showing a first embodiment.

As shown in FIG. 1, the arrangement comprises as a first pipe section that is an inner pipe 1 having an end portion received in an outer pipe 2 formed by the end portion of a second pipe section. Between the inner pipe 1 and the outer pipe 2, an annular wire mesh pad is disposed to form a dampening structure which however is not visible in FIG. 1. The outer pipe 2 is provided with a radially projecting bolt 3 which serves as part of a coupling structure. For symmetry and stabilization reasons, generally at least two such radially extending bolts 3 are used which are distributed uniformly over the circumference of the outer pipe 2. For simplification, an arrangement with only one bolt 3 and one bolt 4 will be described with reference to FIG. 1, the bolt 4 being attached to the inner pipe and serving as another part of the coupling structure. A spring structure 5 is rigidly connected to one of the bolts 3, 4. The spring structure design depends on the available installation space and the accessibility in or at the vehicle. The spring structure 5 may, for example, include an eye portion 5a, which receives the bolt 3 and which is rigidly connected to the bolt 3, and an elongated axially extending center portion 5b consisting of two parallel legs disposed adjacent each other and extending from the eye portion 5a axially toward the inner pipe 1. At its free end, the spring structure 5 has a clamp-like extension 5c in which the bolt 4 is received. With this arrangement, the spring structure 5 acts like a leafspring and forms at the same time an engagement means for snap-in engagement of the bolt 4. During assembly, the two pipe sections 1 and 2 are pressed together and the spring structure receives, with its open end, that is, the clamp-like extension 5c, the bolt 4 in a form-engaging fashion. A tension spring 6, which is inserted into a slot 7 formed in the second pipe section 2 and which engages the slot wall and an annular flange structure 8 at the end of the pipe section 1 retains the two pipe sections in engagement with each other with the force of the spring 6.

The design of the spring structure 5 depends on the desired properties. It may consist of a round material such as a wire spring or of a single or multi-layer flat material. It may also consist of a mixture of the two and, for example, have a half way round or flat-oval or similar shape. In addition, the spring structure 5 may be so designed that the two legs of the center part 5*b* are disposed adjacent each other. They can be disposed simply in abutment with each other or, selectively, they may be firmly connected to each other. Of course, there may also be a gap between the two legs of the center part 5*b* (see FIG. 1). It is essentially the shape and arrangement of the center part 5*b* that determines the spring properties and the extent to which the two end portions of the legs can be bent apart at the clamp-like extension 5*c*.

Instead of mounting the spring structure 5 on the bolt 3 by means of an eye portion 5, the spring structure may also be mounted directly on the second pipe section, that is, the outer pipe 2. For this purpose, however, the respective end portion must be formed appropriately is so that it can be properly connected for example by spot welding.

It is also possible to provide the arrangement in the opposite way that is the bolt, on which the spring structure 5 is mounted, is disposed on the inner tube section 1.

Also, the spring structure may be mounted directly on the inner tube section 1. The designation first pipe section and second pipe section should therefore be considered incidental.

Figure 2:
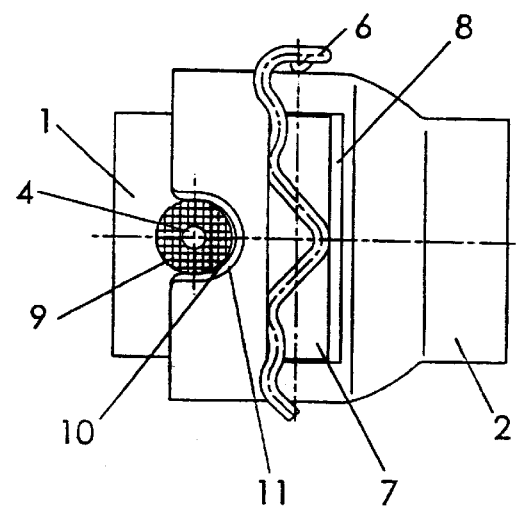
FIG. 2 is a side view of a pipe coupling showing a second embodiment according to the invention.

FIG. 2 shows a second embodiment wherein, instead of the spring structure 5, a spring elastic wire mesh pad 9 is mounted on the bolt 4 of the first pipe section 1. The outer pipe 2 which represents the second pipe section includes a corresponding recess 10, which is adapted to the shape of the wire mesh pad 9 and receives the wire mesh pad 9. The wire mesh pad 9 is circular or oval in shape and has a central opening adapted to the diameter of the bolt 4 and receiving the bolt 4 which forms the connecting member for connection to the pipe section 1.

For snugly receiving the wire mesh pad 9 in the recess 10, the recess 10 is formed into the end of the second pipe section that is the outer pipe 2 in a semi-circular fashion. In order to prevent damage to, or destruction of, the wire mesh pad 9 during operation the recess 10 in the outer pipe section 2 is provided with a bent-over rim portion 11 which extends fully or partially around the recess 10. In this way, there are no sharp edges and the rim portion provides for good support of the wire mesh pad 9. As can be seen, the coupling between the first pipe section 1 and the second pipe section 2 is spring elastic in that the bolt 4 is inserted into the opening in the wire mesh pad 9. For the spring loaded engagement of the two pipe sections with each other, there is again a pretension spring 6 provided which is somewhat different in shape from the one shown in FIG. 1.

With the arrangement including the wire mesh pad 9, engine initiated vibrations cannot only be uncoupled but they can also be dampened by the internal friction in the wire mesh pad 9. The number of wire mesh pads 9, distributed over the circumference, depends on the desired properties of the whole coupling. In order to prevent cogging of the two pipe sections, at least two wire mesh pads 9 should be provided in a circumferentially spaced relationship.

Figure 3:
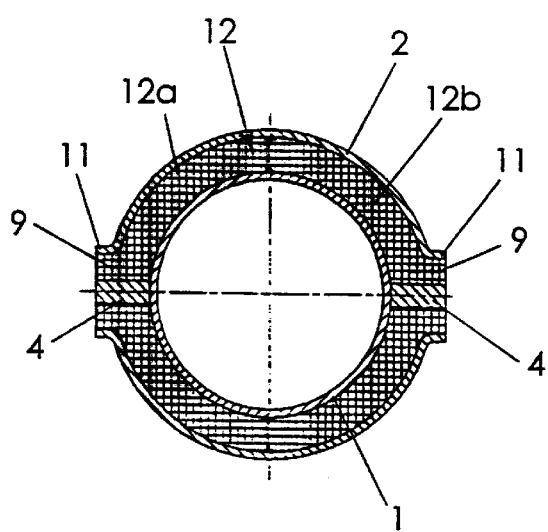
FIG. 3 is a cross-sectional view taken along line III—III of FIG. 4.
Figure 4:
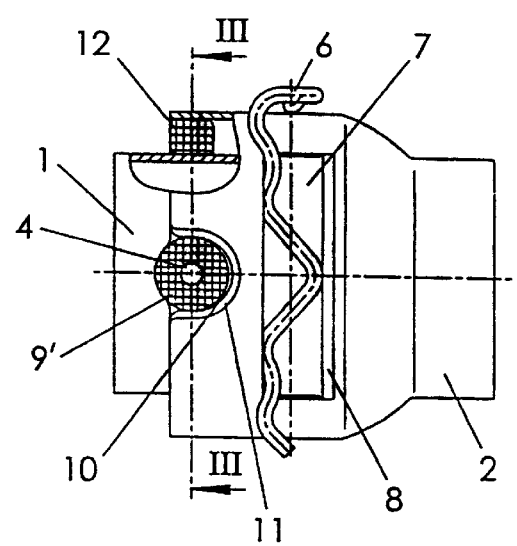
FIG. 4 is a side view of a pipe coupling showing a third embodiment of the invention.

FIGS. 3 and 4 show another embodiment wherein an elastic coupling is obtained by means of a connecting member and a coupling structure in which the wire mesh pad is disposed as a dampening means between the two pipe sections. As shown, an annular wire mesh pad 12 is disposed between the first pipe section 1, that is, the inner pipe and the second pipe section 2, that is, the outer pipe. The annular wire mesh pad 12 consists of two parts, that is semi-circular half shells 12*a* and 12*b*. In each half shell 12*a*, 12*b*, the wire mesh pad 12 has a radially outwardly directed circular extension 9' corresponding in shape to the wire mesh pad 9 of FIG. 2. The two extensions 9' of the half shells 12*a* and 12*b* are arranged diametrically opposite each other as can be seen from FIG. 3. Because of this arrangement, the wire mesh pad 12 is provided in the form of two half shells 12*a* and 12*b*.

The two extensions 9' are provided—like the wire mesh pads 9 of FIG. 2 with a central opening in which a bolt 4 is received, which is firmly connected to the first pipe section, that is, the inner pipe 1. Again the wire mesh pad extensions 9' are received in recesses which are formed into the ends of the outer pipe section 2 and which have bent-over rim portions 11 engaging the pad extensions 9'.

With the combination of the two wire mesh pad portions 9 and 12 as shown in FIGS. 3 and 4, the number of required individual components of the pipe coupling is reduced and the assembly of the whole arrangement is facilitated since, in practice, the pad parts 9 and 12 can easily be manufactured as an integral parts such that a single piece is provided for each half shell 12*a*, 12*b*. In other words, the two pad extensions 9' are formed integrally with the wire mesh pads 12, which are provided for the dampening of vibrations reaching the coupling, the two pad extensions 9' preventing relative rotation of the pipe sections 1 and 2.

What is claimed is:

1. An arrangement for interconnecting two exhaust pipe sections in an exhaust system of a motor vehicle with a vibration damping structure disposed between said two pipe sections, a first one of said pipe sections having a first coupling bolt radially extending therefrom and the second pipe section having a second coupling bolt radially extending from said second pipe section and a spring structure including one end with an eye portion receiving one of said bolts and the other end of said spring structure having a clamp-like extension engaging the other bolt.

2. An arrangement according to claim 1, wherein said spring structure includes a center section extending in axial direction between said eye portion and said clamp-like extension.

3. An arrangement according to claim 2, wherein said spring structure has the form of a leaf or wire spring.

4. An arrangement for interconnecting first and second exhaust pipe sections in an exhaust system of a motor vehicle with a vibration damping structure disposed between said two pipe sections, including a coupling structure comprising a coupling member extending radially from said first pipe section and said second exhaust pipe section including a recess snugly receiving a spring-elastic pad, said spring-elastic pad having a central radially extending opening formed therein and said radially extending coupling member being received in said radially extending opening.

5. An arrangement according to claim 4, wherein said radially extending coupling member is a bolt and said spring elastic pad is an annular wire mesh pad having a central opening into which said bolt is inserted.

6. An arrangement according to claim 4, wherein said recess includes an outwardly projecting rim portion.

7. An arrangement according to claim 4, wherein said vibration damping structure is an essentially annular wire mesh pad which is disposed between said first and said second exhaust pipe sections and which has at least one radial extension with a radial opening in which said coupling member is received.

8. An arrangement according to claim 7, wherein said radial extension is annular forming a central radial opening and said coupling member is a radial bolt extending into said radial opening.

9. An arrangement according to claim 8, wherein said annular wire mesh pad comprises two half shells, each of which includes one radial annular extension and said one exhaust pipe section has two radial bolts extending into said radial annular extensions.

10. An arrangement according to claim 4, wherein said second exhaust pipe section has a larger diameter end portion than said first exhaust pipe section and said first exhaust pipe section is received in the larger diameter end portion of said second exhaust pipe section.

* * * * *